J. L. KELLY.

DENTAL INSTRUMENT.

APPLICATION FILED JAN. 7, 1911.

Reissued Sept. 30, 1913. 13,621.

Witnesses:
L. S. Mann,
S. N. Pond

Inventor:
John L. Kelly
By Offield, Towle, Graves & Offield
Atty's.

COLUMBIA PLANOGRAPH CO., WASHINGTON, D. C.

UNITED STATES PATENT OFFICE.

JOHN L. KELLY, OF CHICAGO, ILLINOIS, ASSIGNOR OF ONE-HALF TO FRANK H. SKINNER, OF CHICAGO, ILLINOIS.

DENTAL INSTRUMENT.

13,621. Specification of Reissued Letters Patent. Reissued Sept. 30, 1913.

Original No. 971,382, dated September 27, 1910, Serial No. 530,197. Application for reissue filed January 7, 1911. Serial No. 601,475.

*To all whom it may concern:*

Be it known that I, JOHN L. KELLY, a citizen of the United States, residing at Chicago, in the county of Cook and State of Illinois, have invented certain new and useful Improvements in Dental Instruments, of which the following is a specification.

My present invention relates to dental instruments and more particularly to dental instruments devised with a view of holding pieces of wood or other suitable material for use in polishing tooth surfaces; and it consists in the peculiar and advantageous instrument hereinafter described and claimed.

Figure 1:
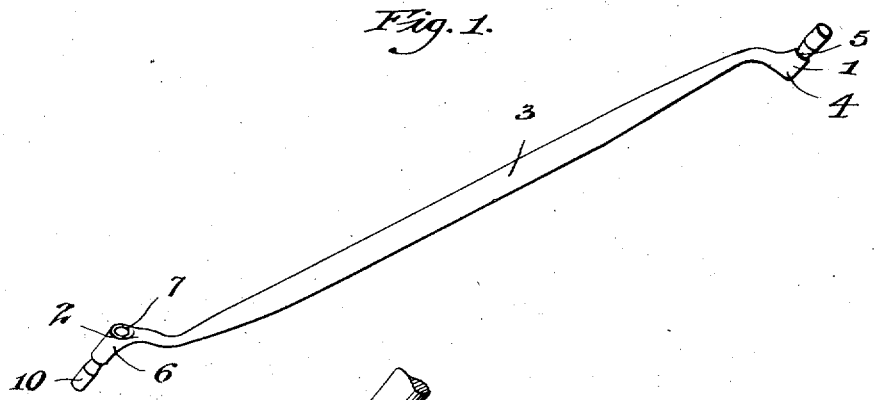
Figure 3:
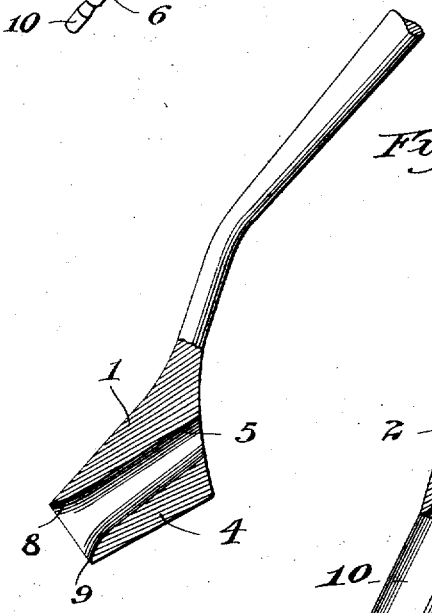
Figure 2:
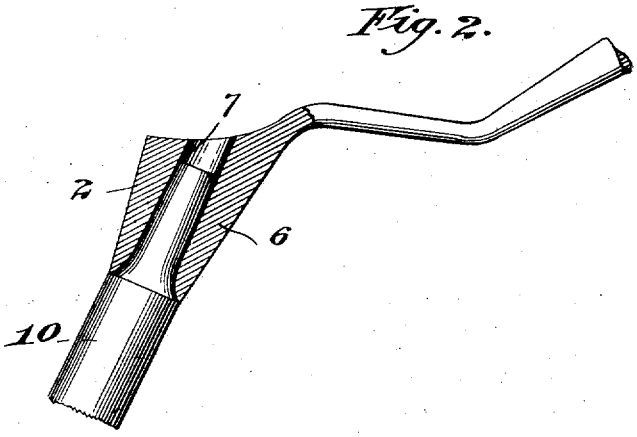

In the drawings, accompanying and forming part of this specification: Figure 1 is a perspective view of the best practical embodiment of my invention of which I am aware; the same being shown with pieces of wood socketed in the bores. Fig. 2 is an enlarged longitudinal section through one end portion of the instrument and showing a piece of wood secured in the tapered bore thereof. Fig. 3 is a similar view of the other end portion of the instrument, but with the wood omitted.

Similar numerals designate corresponding parts in all of the views of the drawings, referring to which:

1 and 2 are the opposite end portions of the instrument, and 3 is the intermediate handle portion which is integral with the said end portions and of increased thickness in about the proportion illustrated. The end portion 1 extends at an angle from the handle portion 3 and terminates in a head 4 in which is an inwardly tapered bore 5, and the end portion 2, which is longer than the end portion 1, extends at an angle of greater degree from the handle portion and terminates in a head 6 in which is an inwardly tapered bore 7 disposed at a different angle from the bore 5 in head 4. Each of the bores 5 and 7 is provided at its outer end with a flared mouth 8 having a cutting edge 9, and consequently it will be manifest that when a piece of wood or other material suitable to the purpose is forced into either bore, the wood will be reduced and shaped and thereby caused to nicely fit the tapered bore in which it will be firmly held, though in such manner that it may be turned in the bore when it is necessary to adjust it to better suit it to a particular tooth surface to be polished.

In the practical use of the instrument, pieces of wood 10 are forced into the bores 5 and 7, as shown in Fig. 1, and then the instrument is manipulated by the dentist to polish the surfaces of teeth in the mouth of a patient, first one piece of wood and then the other being manipulated in the mouth and against a tooth as the exigencies of the case require.

As will be observed by reference to Figs. 2 and 3 the inner ends of the bores 5 and 7 are open, and hence when necessity demands a punching istrument may be employed to displace the pieces of wood subsequent to use thereof.

It will be gathered from the foregoing that my novel instrument is adapted to hold a piece of wood or other material in such position that all parts of the tooth surface may be reached and polished with ease; also, that a piece of wood pressed into either of the bores is formed to facilitate its entry into the bore, and, because of the taper of the bore, the farther the piece is forced in, the tighter it is held, although the wood is slightly movable so that its position may be changed in the bore with a view of enabling it to reach all sides and surfaces of a tooth and also under the gum as is necessary frequently in the cleaning and polishing of teeth and the treatment of diseases of the teeth and gums.

Having described my invention, what I claim and desire to secure by Letters Patent, is:

1. A dental instrument for the purpose described, comprising a handle portion, end portions extending laterally at different angles from said handle portion, and bored heads on said end portions adapted to receive and hold pieces of polishing material, substantially as described.

2. A dental instrument for the purpose described, comprising a handle portion, end portions angularly disposed with relation to said handle portion, and bored heads on said end portions adapted to receive and hold pieces of polishing material, the bores of said heads being disposed at different angles to said handle portion, substantially as described.

3. A dental instrument, comprising an intermediate handle portion, reduced end portions, of different lengths, extending laterally at different angles from the handle portions, and heads on the said end portions, each head having an inwardly tapered bore, open at its opposite ends, and provided with a flared mouth and a cutting edge at its outer end; the said bores being also disposed at different angles to the handle portion, for the purpose set forth.

In testimony whereof I affix my signature in presence of two witnesses.

JOHN L. KELLY.

Witnesses:
SAMUEL N. POND,
DAISY C. THORSEN.

Copies of this patent may be obtained for five cents each, by addressing the "Commissioner of Patents. Washington, D. C."